United States Patent
Wang

(10) Patent No.: US 6,383,322 B1
(45) Date of Patent: May 7, 2002

(54) METHOD FOR MANUFACTURING KNOCKDOWN BOARD MATERIAL

(76) Inventor: Wen Ping Wang, NO85, Wu Fu Rd., Wu Feng Village, Taichung Hsien (TW)

( * ) Notice: Subject to any disclaimer, the term of this patent is extended or adjusted under 35 U.S.C. 154(b) by 0 days.

(21) Appl. No.: 09/570,030

(22) Filed: May 12, 2000

(51) Int. Cl.[7] .......................... B32B 31/08; B32B 31/12; B32B 31/18

(52) U.S. Cl. ........................ 156/79; 156/240; 156/258; 156/269; 156/324

(58) Field of Search ................................. 156/231, 237, 156/240, 78, 79, 258, 269, 324

(56) References Cited

U.S. PATENT DOCUMENTS

| | | | | |
|---|---|---|---|---|
| 3,579,941 A | * | 5/1971 | Tibbals | 52/384 |
| 4,169,005 A | * | 9/1979 | Fogle et al. | 156/272 |
| 4,354,851 A | * | 10/1982 | Hix et al. | 8/471 |
| 4,743,509 A | * | 5/1988 | Kokrhanek | 428/425 |
| 5,965,207 A | * | 10/1999 | Kropfeld et al. | 427/403 |
| 5,968,630 A | * | 10/1999 | Foster | 428/77 |
| 6,191,181 B1 | * | 2/2001 | Weikard et al. | 522/17.4 |

* cited by examiner

*Primary Examiner*—Sam Chuan Yao
(74) *Attorney, Agent, or Firm*—Rosenberg, Klein & Lee

(57) ABSTRACT

Method for manufacturing knockdown board material, including steps of: using a conveying device to convey a board material and immerge the board material into a resin tank to which a fireproof agent is added, after the resin fully infiltrates into the board material, the board material being compressed by rubber rollers and then dried and solidified to form a protective film; attaching printed paper to the surface of the board material by way of adhesion or thermal transfer-printing stripes on the surface of the board material; painting a layer of surface treatment agent on the surface of the board material by way of rolling or spraying; laying EVA foam material on back face of the board material and embossing stripes on the foam material; and cutting the board material into a certain shape.

11 Claims, 7 Drawing Sheets

METHOD FOR MANUFACTURING KNOCKDOWN BOARD MATERIAL

BACKGROUND OF THE INVENTION

The present invention relates to a method for manufacturing knockdown board material, in which the wooden board material is associated with foam material. By means of the method, the board material has anti-humidity, fireproof and bactericidal effect. In addition, the printing material is easy to attach to the surface of the board material and the surface is not subject to wearing and detachment. When paved, the board material is able to absorb the unplainness of the ground and achieve a soft protective effect as well as beautify the appearance and improve using effect.

The existent knockdown floor tiles can be divided into several kinds including plastic floor tiles, EVA foam floor tiles and real wooden floor tiles. With respect to the plastic floor tile, it has thin thickness and in the case that the original ground is unplane, after laid on the ground, the surface of the plastic floor tile will be also unplane.

The EVA foam floor tile is made of EVA foam material. The surface of such floor tile is transfer-printed with stripes. Such floor tiles are cut with corresponding recesses and projections and can be quickly assembled. Such material is soft and safe. However, when demolded, a demolding agent must be added to the foam material. The demolding agent will be left on the foam material. This will result in difficulty in coloring and transfer-printing of the foam material. Even if the surface of the foam material is printed with a picture layer, such picture layer is very likely to detach after a period of use. Therefore, the picture will be deteriorated and the foam material is subject to wearing. In addition, the foam material is quite soft so that in the case that a heavy load is placed thereon for a long time, the foam material will be recessed (such as the part on which a desk leg is rested). This leads to poor appearance.

The real wooden floor tile has poor anti-humidity ability and is verminous. Therefore, it is necessary to elevate such floor tiles. and previously treat such floor tiles with anti-humidity and anti-vermin treatment. Therefore, it is time-consuming and laborious to lay such floor tiles. Moreover, the real wooden floor tiles are subject to deformation due to weather change so that such floor tiles have considerable thickness for avoiding deformation.

SUMMARY OF THE INVENTION

It is therefore a primary object of the present invention to provide a method for manufacturing knockdown board material, by which method the board material has a suitable softness and anti-wearing, anti-humidity, fireproof and bactericidal effect. In addition, the surface of the board material can be easily printed with fine stripes and pictures. Also, the safety in use of the board material can be ensured.

According to the above object, the method for manufacturing knockdown board material of the present invention includes steps of:

Step 1: immerging a board material into a resin tank: using a conveying device to convey a board material (such as plywood or laminated board) with a certain dryness and immerging the board material into a resin tank, after the resin fully infiltrates into the board material, the board material being compressed by rubber rollers and then dried and solidified to form a protective film;

Step 2: beautifying the surface: thermal transfer-printing stripes on the surface of the board material;

Step 3: treating the surface with anti-abrasion treatment: painting a layer of surface treatment agent on the surface of the board material by way of rolling, the surface treatment agent containing polyurethane acrylate as the main component and containing 5–60 weight % monomer, 1–15 weight % photoinitiator, 1–15 weight % photosynergists and below 10 weight % solvent, the surface treatment agent being then dried and solidified;

Step 4: laying EVA foam material on back face of the board material, and

Step 5: cutting the board material into a certain shape.

The present invention can be best understood through the following description and accompanying drawings wherein:

DETAILED DESCRIPTION OF TEE PREFERRED EMBODIMENTS

Figure 1:
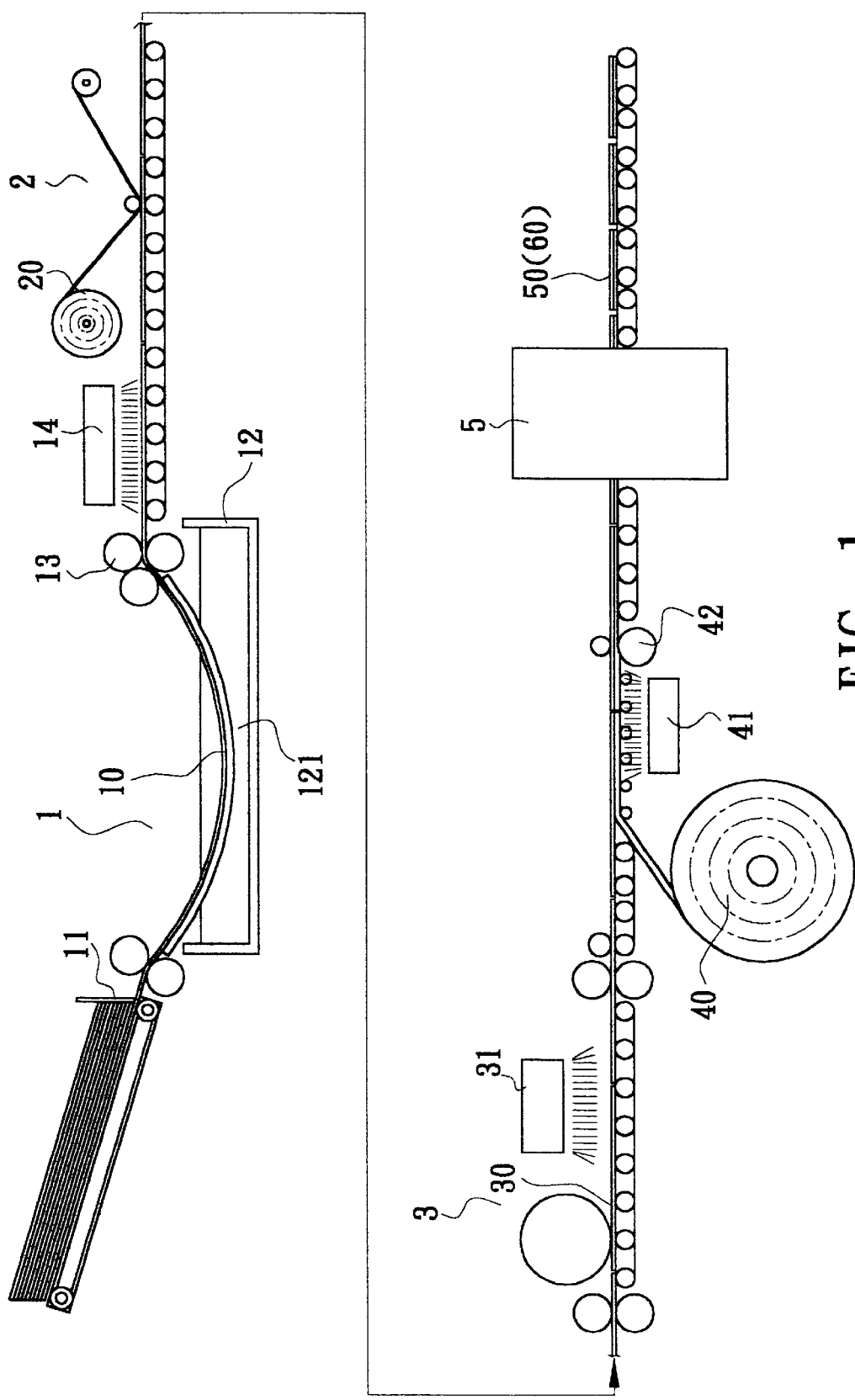
FIG. 1 is a flow chart of the manufacturing method of a preferred embodiment of the present invention.
Figure 2:
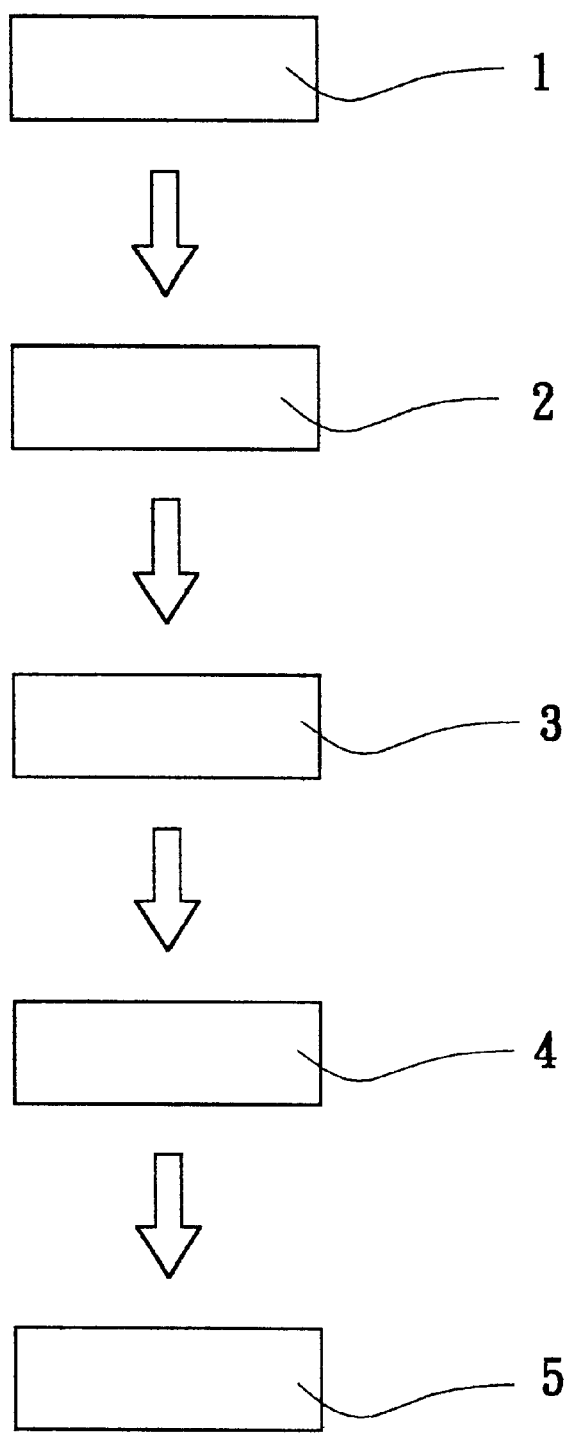
FIG. 2 is a block diagram of the manufacturing method of the preferred embodiment of the present invention.
Figure 3:
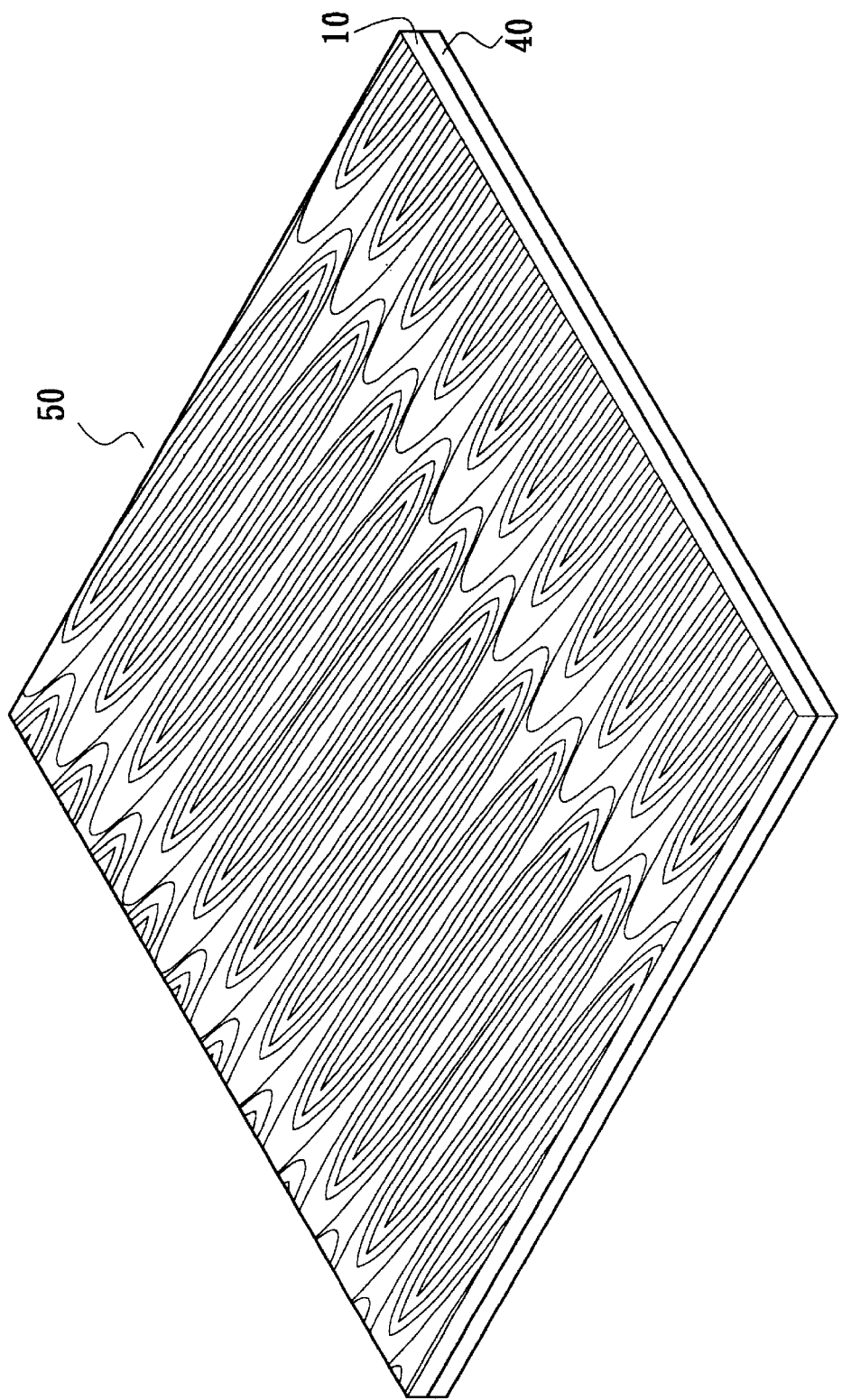
FIG. 3 is a perspective view of the board material made by the manufacturing method of the preferred embodiment of the present invention.
Figure 4:
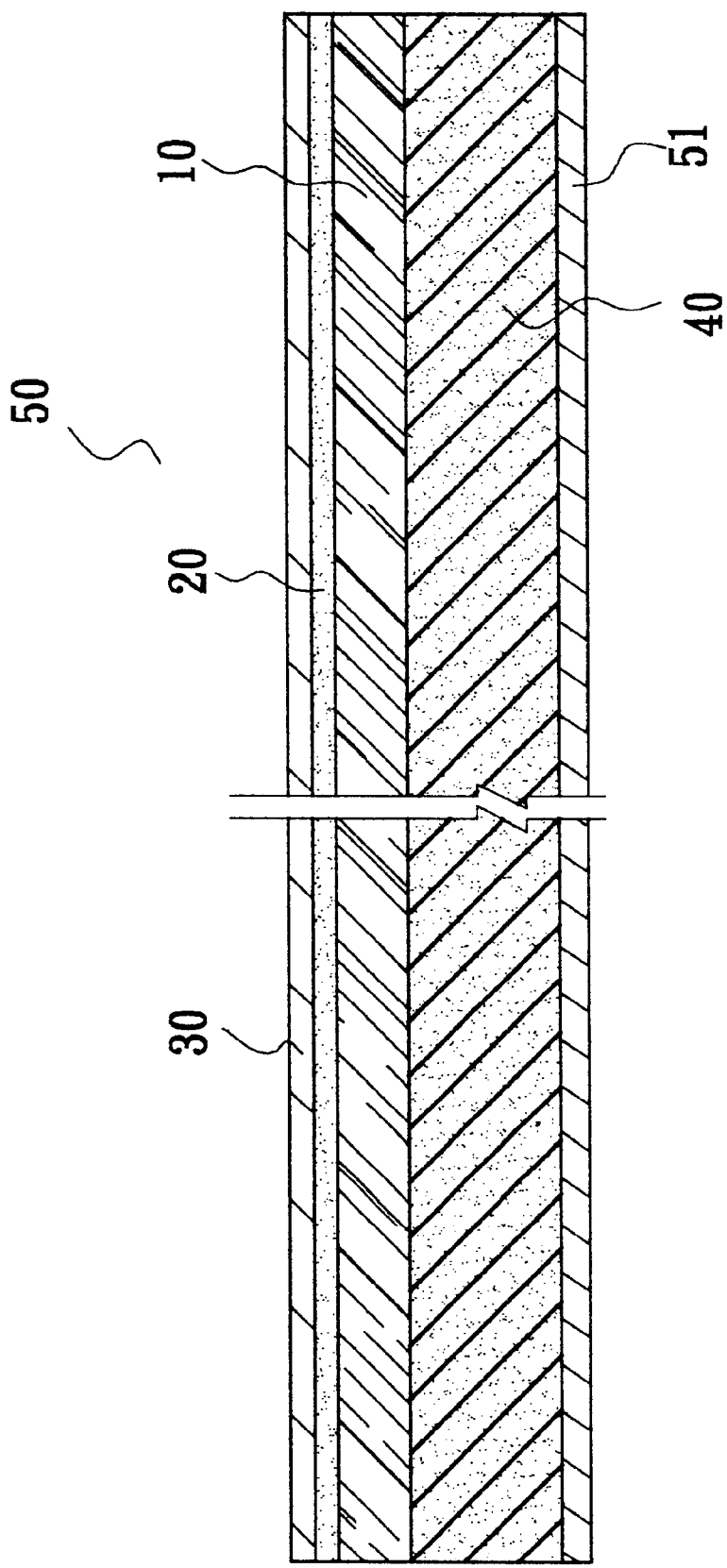
FIG. 4 is a sectional view according to FIG. 3.

Please refer to FIGS. 1 to 4. The method for manufacturing knockdown board material of the present invention includes steps of:

Step 1: immerging a board material 10 into a resin tank 12: using a conveying device 11 to convey a board material 10 (such as plywood or laminated board) with a certain dryness and immerging the board material 10 into a resin tank 12 with anti-humidity effect, a fireproof agent, bactericide and vermicide being added into the resin 121 for enhancing the fireproof, bactericidal and vermifuge effect, after the resin 121 fully infiltrates into the board material 10, the board material 10 being compressed by rollers 13 (which are preferably made of soft material such as rubber) to remove the excessive resin 12 of the surface of the board material and make the resin evenly attach to the surface, then the board material going through a drying treatment 14 to form a protective film for avoiding deformation of the board material 10 due to weather change, the board material 10 becoming anti-humidity, fireproof and vermifuge and forming a bridge, whereby an ink or adhesive can attach thereto and a fine picture can be made on the surface thereof;

Step 2: beautifying the surface: thermal transfer-printing stripes on the surface of the board material or attaching printed paper 20 thereto by way of adhesion;

Step 3: treating the surface with anti-abrasion treatment: painting a layer of surface treatment agent 30 on the surface of the board material by way of rolling or spraying, the surface treatment agent 30 containing polyurethane acrylate as the main component and containing 5–60 weight % monomer, 1–15 weight % photoinitiator, 1–15 weight % photosynergists and below 10 weight % solvent, an ultraviolet ray 31 (or light beam) being projected onto the agent to quickly harden the same and enhance the anti-abrasion ability to protect the surface of the board material 10;

Step 4: laying EVA foam material 40 on back face: directly attaching EVA (ethylvinyl acetate) foam material 40 onto the back face of the board material 10, the back face of the foam material 40 being heated 41 and embossed with stripes 42 to have softness and be able to offset the unplainness of the ground and achieve a slipproof effect; and Step 5: cutting the board material 10 into a certain shape (referring to FIGS. 3 and 4): prior to cutting the board-material 10, laying back gum 51 on the back face of the foam material 40 to facilitate laying.

Figure 5:
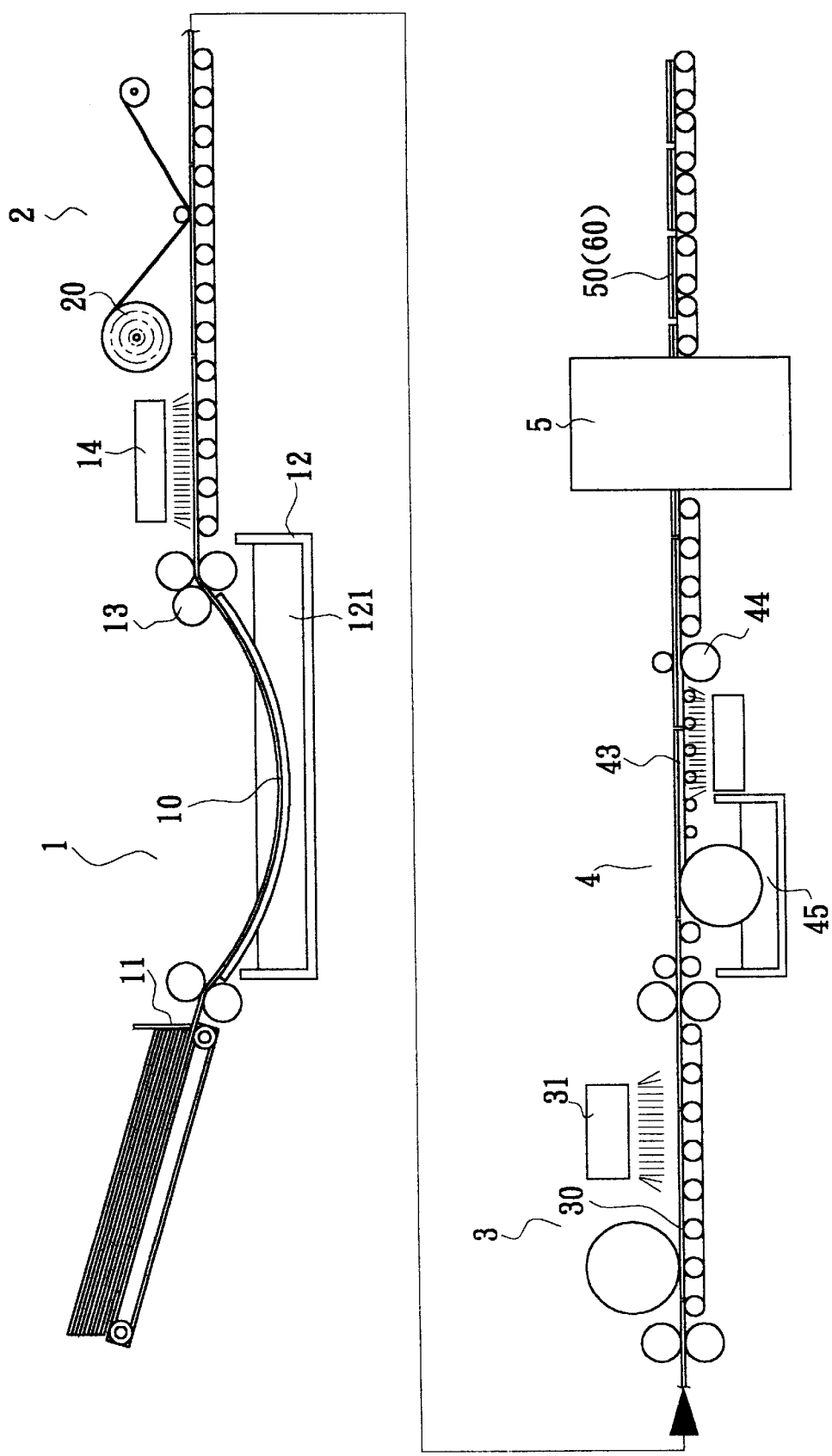
FIG. 5 is a flow chart of the manufacturing method of another embodiment of the present invention.

FIG. 5 shows another embodiment of the present invention, wherein in step 4, EVA liquid is painted on the back face of the board material 10 and then heated and foamed into EVA foam material 43 attaching to the board material 10. In addition, the back face of the foam material 43 is embossed with stripes 44.

Figure 6:
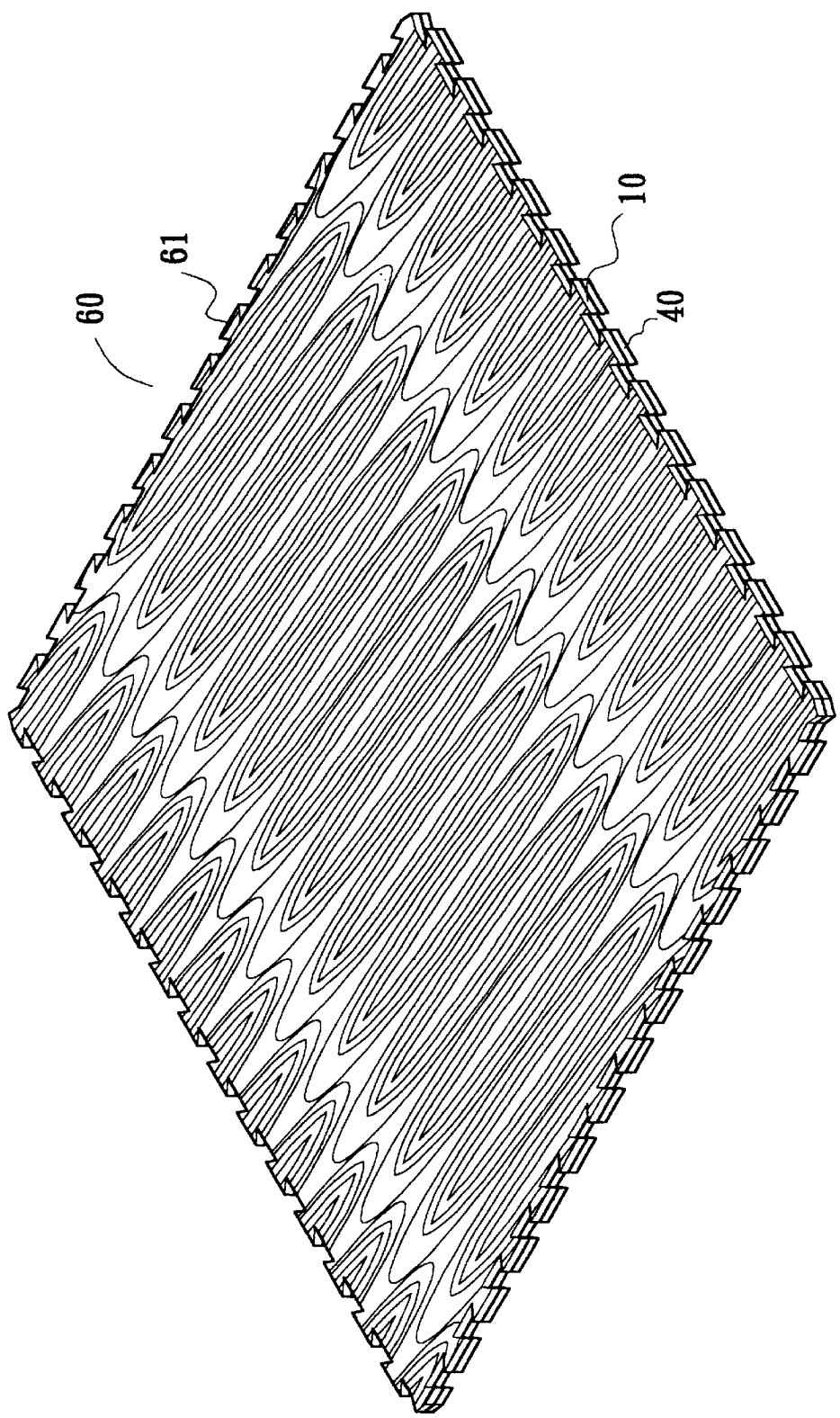
FIG. 6 is a perspective view of the board material made by the manufacturing method of another embodiment of the present invention.
Figure 7:
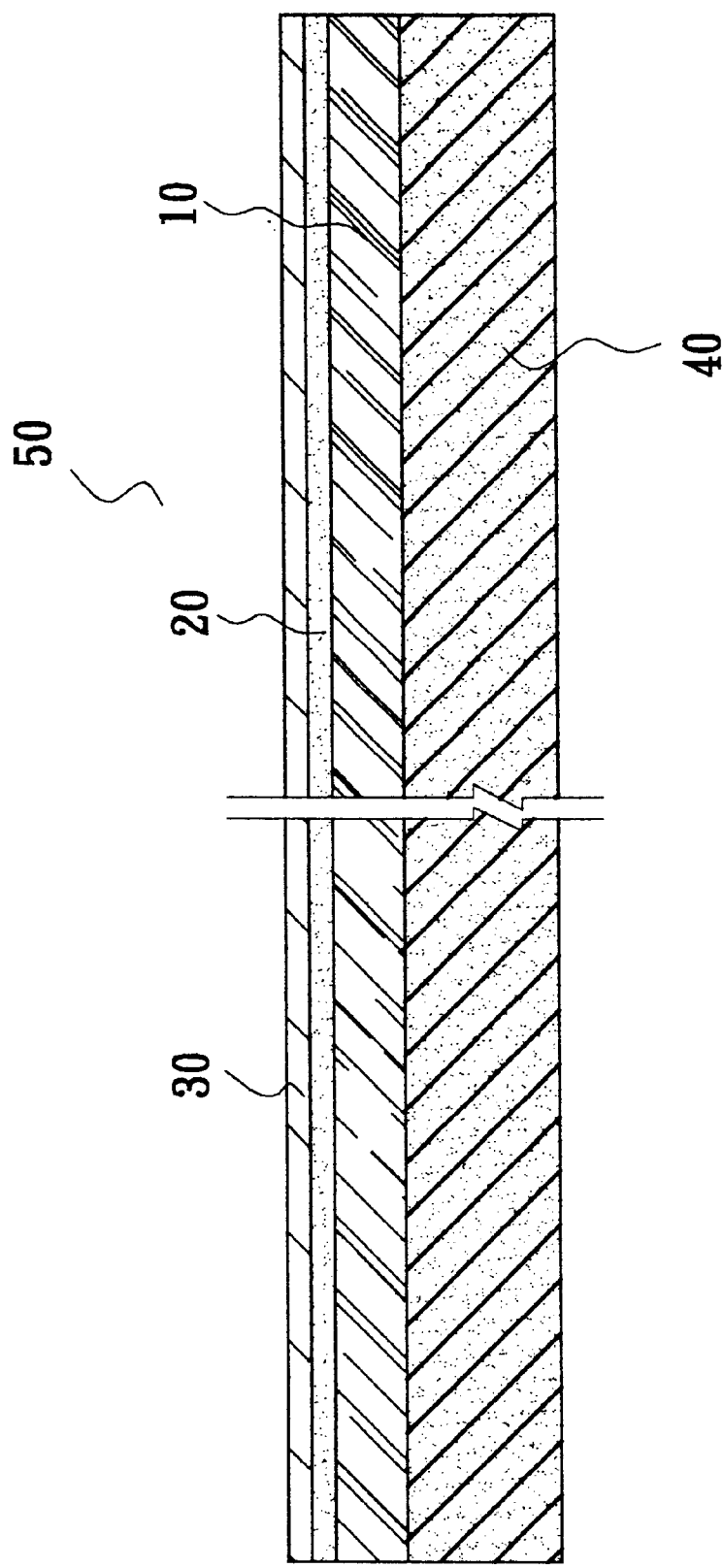
FIG. 7 is a sectional view according to FIG. 6.

FIGS. 6 and 7 show still another embodiment of the present invention, wherein in step 5, the periphery of the board material 60 cut into a certain shape is formed with corresponding tooth blocks 61 to facilitate assembly and laying.

The present invention has the following advantages:

1a. The resin fully infiltrates into the wooden board material (such as plywood and laminated board) to enhance the fireproof, vermifuge and anti-humidity effect. In addition, a protective resin film is formed on the surface, which is compatible with the transfer-printing layer or gum material in chemical properties. Therefore, the ink or the gum which is originally uneasy to attach to the wooden material or foam material can easily attach thereto to facilitate manufacturing of fine picture on the surface.

2a. The surface of the wooden board material is painted with a layer of surface treatment agent by way of rolling or spraying. The surface treatment agent contains polyurethane acrylate as the main component and contains 5–60 weight % monomer, 1–15 weight % photoinitiator, 1–15 weight % photosynergists and below 10 weight % solvent. An ultraviolet ray or light beam is projected onto the agent to quickly harden the same. The smaller the wearing index is (wearing index=wearing weight loss/cycle number ×1000 rpm, UV surface treatment agent 500 g/100 cycle wearing index), the better the anti-abrasion effect is and the surface is not subject to wearing.

3a. EVA foam material is laid on the back face of the board material so as to have a suitable softness. The back face of the foam material is embossed with stripes. When laid on the ground, in the case of unplane ground, the foam material is compressed to directly buffer the unplainness so that the wooden board material will not be affected. Therefore, the appearance is enhanced and using effect is improved.

The above embodiments are only used to illustrate the present invention, not intended to limit the scope thereof. Many modifications of the above embodiments can be made without departing from the spirit of the present invention.

What is claimed is:

1. A method for manufacturing knockdown board material, comprising steps of:

a) using a conveying device to convey aboard material having a certain dryness into a resin tank to fully impregnate the board material;

b) compressing the fully impregnated board using rubber rollers;

c) drying the compressed board to solidify the resin and form a protective film;

d) adding an ornamental treatment to the surface of the board material;

e) painting an anti-abrasion surface treatment agent onto the surface of the board material, wherein the surface treatment agent comprises 40–90% polyurethane acrylate as a main component;

f) drying and solidifying the surface treatment on the board;

g) applying a foam material on the back face of the board material to thereby form a foamed laminated board; and, h) cutting the foamed laminated board into a certain shape.

2. The method for manufacturing knockdown board material as recited in claim 1, wherein the step of conveying a board material into a resin tank includes the step of adding a fireproof agent, bactericide and vermicide to the resin.

3. The method for manufacturing knockdown board material as recited in claim 1, wherein the step of adding an ornamental treatment includes the step of attaching a printed paper to the surface of the board material.

4. The method for manufacturing knockdown board material as recited in claim 1, wherein the step of adding an ornamental treatment includes the step of thermally transfer-printing the surface of the board material.

5. The method for manufacturing knockdown board material as recited in claim 1, wherein the step of painting an anti-abrasion surface treatment agent includes the step of painting the surface treatment agent on the board material by way of spraying or rolling.

6. The method for manufacturing knockdown board material as recited in claim 1, wherein the step of painting an anti-abrasion surface treatment agent includes the step of providing the surface treatment agent containing 5–60 weight % monomer, 1–15 weight % photoinitiator, 1–15 weight % photosynergist and less than 10 weight % solvent.

7. The method for manufacturing knockdown board material as recited in claim 1, wherein the step of applying a foam material includes the step of attaching an EVA foam material directly onto the back face of the board material.

8. The method for manufacturing knockdown board material as recited in claim 1, wherein the step of applying a foam material includes the step of forming an EVA foam material on the back face of the board material by applying an EVA liquid thereto that is then heated and foamed.

9. The method for manufacturing knockdown board material as recited in claim 1, wherein the step of applying a foam material is followed by the step of forming stripes on the back face of the foam material.

10. The method for manufacturing knockdown board material as recited in claim 1, wherein the step of applying a foam material is followed by the step of applying a back gum on the back face of the foam material.

11. The method for manufacturing knockdown board material as recited in claim 1, wherein the step of cutting the foamed laminated board into a certain shape includes the step of forming a periphery of the foamed laminated board with corresponding tooth blocks.

* * * * *